March 26, 1957  M. E. AYERS  2,786,693
GOLF BAG CART
Filed Jan. 12, 1954  2 Sheets-Sheet 1
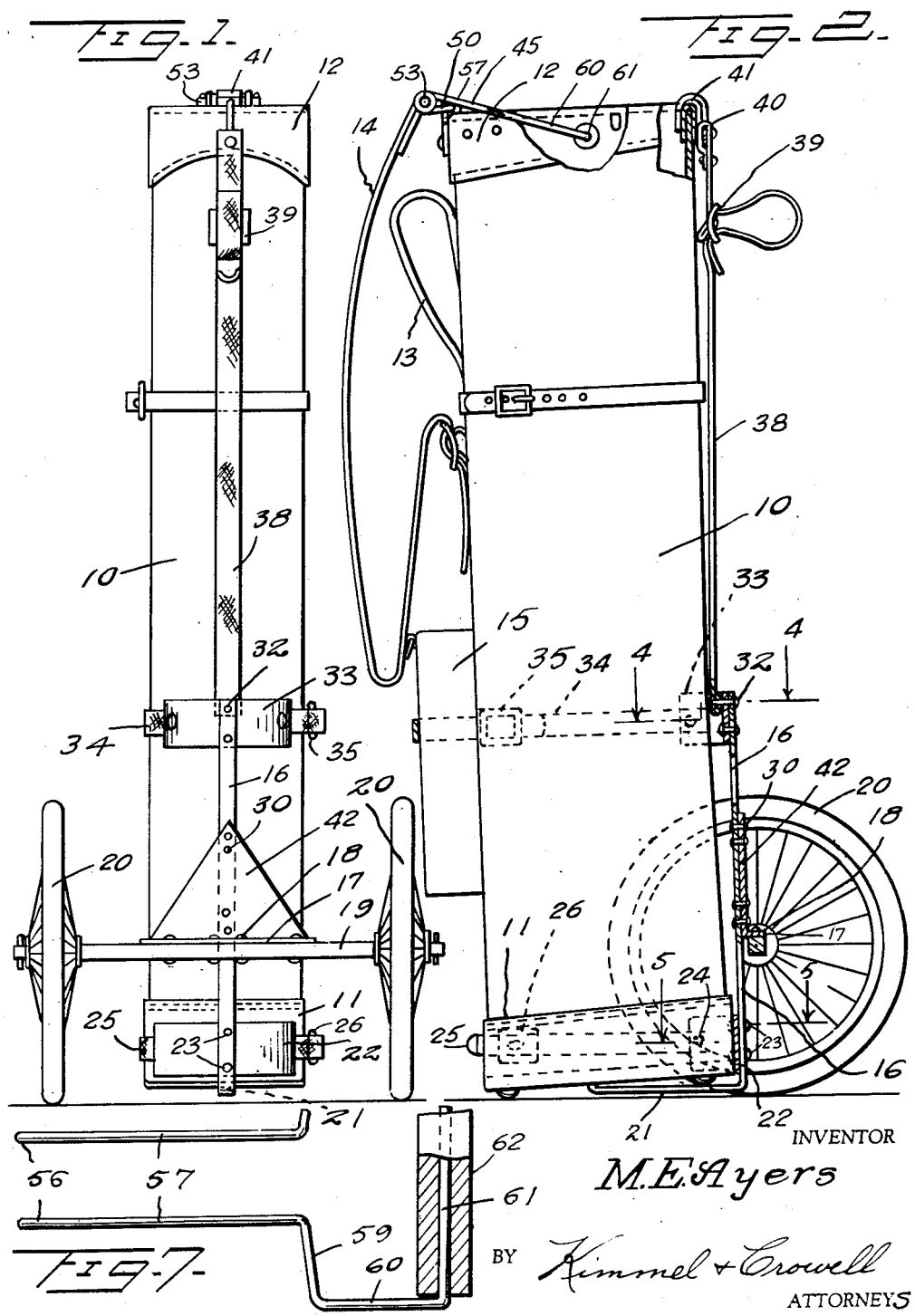
INVENTOR
M. E. Ayers
BY Kimmel & Crowell
ATTORNEYS March 26, 1957 M. E. AYERS 2,786,693
GOLF BAG CART
Filed Jan. 12, 1954 2 Sheets-Sheet 2
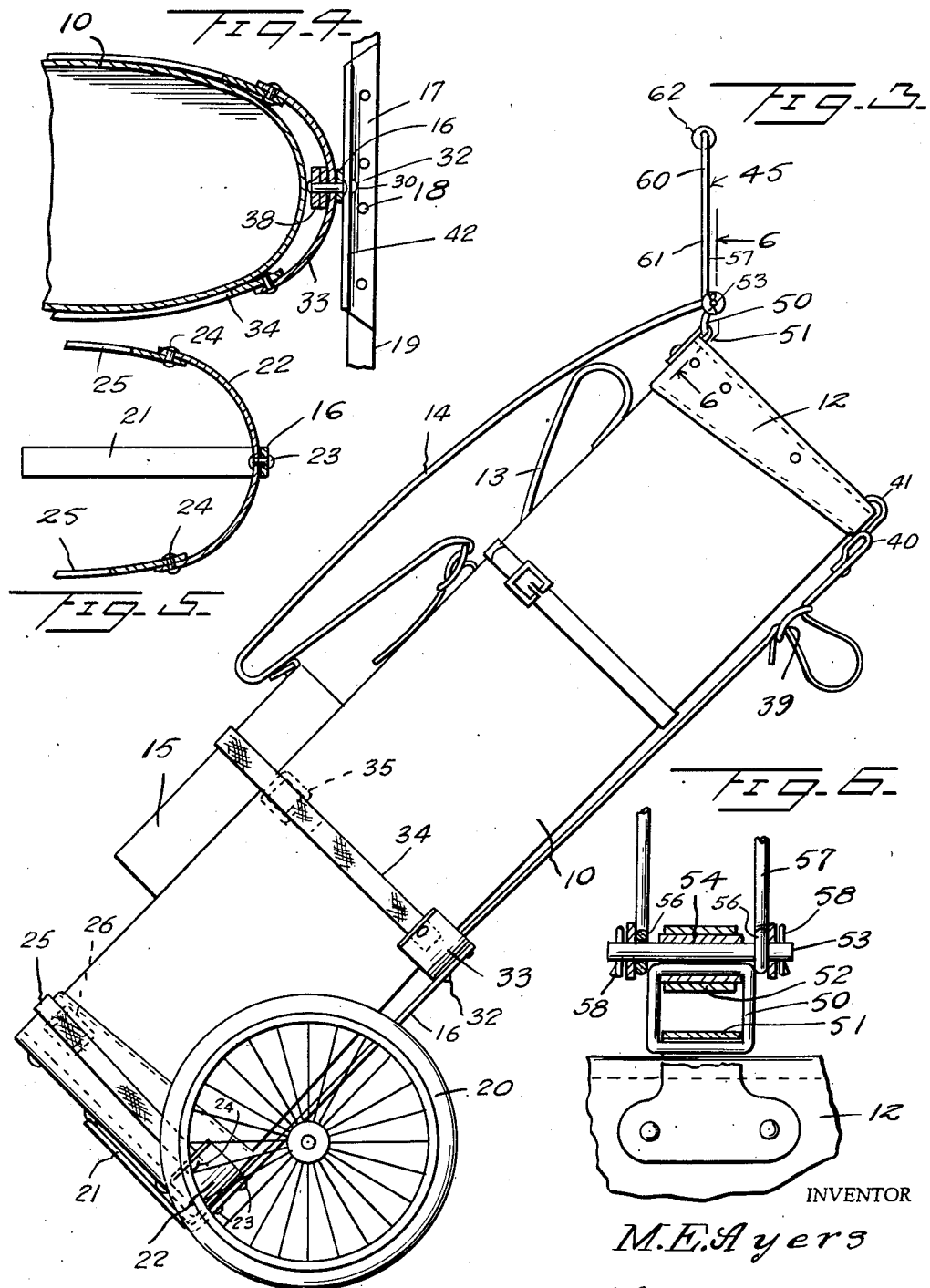
INVENTOR
M. E. Ayers
BY Kimmel & Crowell
ATTORNEYS

2,786,693

GOLF BAG CART

Merton E. Ayers, Bismarck, N. Dak.

Application January 12, 1954, Serial No. 403,562

1 Claim. (Cl. 280—47.26)

This invention relates to a golf bag cart, and has as its primary object the provision of a cart adapted to be attached to a golf bag in order to facilitate movement thereof, the arrangement being such that the bag may be towed on the wheeled cart rather than carried by the golfer.

An additional object of the invention is the provision of a device of this character which may be readily adapted to a variety of sizes and types of golf bags.

Still another object of the invention is the provision of a device of this character which may be quickly and easily applied to or removed from a golf bag.

A still further object of the invention is the provision of such a cart which is simple, sturdy and durable in construction, light in weight, and which embodies relatively few parts so that the device can be produced and sold at a low cost.

Still other objects will in part be obvious and in part be pointed out as the description of the invention proceeds, and shown in the accompanying drawings wherein there is disclosed a preferred embodiment of this inventive concept.

In the drawings:

Figure 1 is a rear elevational view of the cart of the instant invention, showing a golf bag carried thereby.

Figure 2 is a side elevational view of the structure of Figure 1, parts thereof being broken away and certain additional parts being disclosed in dotted lines.

Figure 3 is a view similar to Figure 2, but showing the golf bag in inclined or tilted towing position.

Figure 4 is an enlarged sectional view taken substantially along the line 4—4 of Figure 2, as viewed in the direction indicated by the arrows.

Figure 5 is an enlarged fragmentary sectional view taken substantially along the line 5—5 of Figure 2, as viewed in the direction indicated by the arrows, with the golf bag removed.

Figure 6 is an enlarged sectional view taken substantially along the line 6—6 of Figure 3, as viewed in the direction indicated by the arrows.

Figure 7 is an enlarged detailed view, partially in section, of a constructional element.

Similar reference characters refer to similar parts throughout the several views of the drawings.

Referring now to the drawings in detail, there is generally indicated at 10 a golf bag, of generally conventional construction, including a bottom mounting 11 and a top 12, a handle 13, a carrying strap 14 and a ball pocket 15. A cart or carriage of the instant invention comprises a metallic vertical portion 16 having a flange 17 secured thereto, by means of rivets 30 or the like, and an axle 19, which supports a pair of oppositely disposed wire wheels 20, secured to flange 17 by means of rivets 18.

The lower portion of the upright 16 terminates an inwardly extending finger 21 adapted to lie beneath the bottom of golf bag 10. A flexible metallic member 22 of general arcuate configuration is secured to upright 16 by means of rivets 23 and has secured to its extremities by means of rivets 24 the ends of a strap 25 including a buckle 26 adapted to encircle the lower portion of bag 10.

Secured to the upper portion of upright 16 as by means of rivets 32 is an arcuate flexible metal portion 33 to the ends of which are in turn secured the ends of a strap 34 provided with a buckle 35 also adapted to surround bag 10, as well as the ball pocket 15, which strap 34 also serves to prevent the opening of the ball pocket 15.

A vertical flexible strap 38 is also secured to member 16 by means of the rivets 32, and is provided with an intermediate adjusting buckle 39. The upper end of strap 38 is provided with a loop 40 which secures a hook 41 which is adapted to engage over the upper extremity of the top 12 of the golf bag 10.

A triangular reinforcing member 42 comprising a part of flange 17 is suitably secured as by means of the rivets 30 to upright 16.

From the foregoing the use and assembly of the device should now be readily understandable. Golf bag 10 is merely seated upon inwardly turned tongue 21, and the straps 25 and 34 secured by means of buckles 26 and 35 about the bag 10, whereupon the device is ready to be pulled or towed as desired.

A handle means generally indicated at 45 is also provided for facilitating the towing of the cart, and causing the weight of the cart and its associated bag 10 to depend directly on the hand or arm of the tower. The handle 45 is adapted to be attached to the conventional loop or ring 50 of the golf bag 10 which has one portion thereof secured in a loop 51 carried by the edge of the golf bag, the other end of loop 50 accommodates the end 52 of the normal carrying strap 14.

A pin 53 is adapted to extend through a loop 54 carried by the ring 50, and accommodates the looped ends 56 of a pair of arms 57 comprising a portion of the handle 45.

Cotter pins 58 serve to secure the loops 54 on pin 53. As best shown in Figure 7, the arms 57 terminate in outwardly extending portions 59 which have parallel portions 60 extending from the ends thereof and a transversely extending portion 61 at their upper extremity connecting the two portions 60. The portion 61 is adapted to be surrounded by a handle grip 62 to facilitate the grasping of the handle 45.

From the foregoing it will now be seen that there is herein provided an improved golf bag cart or carrier which accomplishes all the objects of this invention, and others, including many advantages of great practical utility, and which facilitates the towing of a golf bag with a minimum of effort and difficulty, and which may further be attached to and detached from the bag in a relatively simple and expeditious manner.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

A combination golf bag and cart comprising a golf bag having a relatively stiff upright construction, a handle attached to the upper end portion of said bag, a clamp detachably secured in encompassing relation to the base of said bag, a second clamp detachably secured in encompassing relation to said bag adjacent but below the midpoint of said bag, a frame member, means securing the upper end of said frame member to said second clamp, an arm integrally formed with said frame member and extending perpendicularly therefrom in underlying relation to said clamps, means securing the lower end of said frame member adjacent said arm to said first clamp, a triangular axle support plate secured to said frame member with the apex of said plate extending upwardly on said frame, a flange integrally formed on the lower end of said plate and extending perpendicularly therefrom, an axle secured to said flange and extending transversely thereof, wheels mounted on opposite ends of said axle, a hook engaged over the top edge of said bag, and flexible means adjustably securing said hook to said frame, whereby said golf bag is secured in upright position on said frame with said bag and said handle cooperating with said frame and said wheels to form a golf cart.

References Cited in the file of this patent

UNITED STATES PATENTS

| | | |
|---|---|---|
| 1,176,031 | Cady | Mar. 21, 1916 |
| 1,282,600 | Lawlor | Oct. 22, 1918 |
| 1,751,902 | Brown | Mar. 25, 1930 |
| 2,001,894 | Smith | May 21, 1935 |
| 2,236,053 | Caron | Mar. 25, 1941 |
| 2,574,232 | Welsh | Nov. 6, 1951 |
| 2,619,360 | Alter | Nov. 25, 1952 |
| 2,621,799 | Wilson | Dec. 16, 1952 |
| 2,626,815 | Chamberlin | Jan. 27, 1953 |
| 2,633,317 | Marsh | Mar. 31, 1953 |
| 2,648,545 | Cassidy | Aug. 11, 1953 |
| 2,662,776 | Hurst | Dec. 15, 1953 |
| 2,687,895 | Rutledge | Aug. 31, 1954 |
| 2,723,863 | Mattio | Nov. 15, 1955 |